United States Patent Office.

JOHN GALLEMORE DALE AND EDWARD MILNER, OF WARRINGTON, ENGLAND.

Letters Patent No. 97,365, dated November 30, 1869.

IMPROVED MODE OF PRODUCING WHITE LEAD.

The Schedule referred to in these Letters Patent and making part of the same

*To all whom it may concern:*

Be it known that we, JOHN GALLEMORE DALE and EDWARD MILNER, of Warrington, in the county of Lancaster, England, have invented a new and useful Improved Method of Producing White Pigments from Lead; and we do hereby declare that the following is a full and exact description thereof.

Our invention relates to an improved method of manufacturing white lead, (carbonate of lead,) by the action of the soluble acid, carbonates of the alkalies on litharge, hydrated oxides of lead, or insoluble basic salts of lead.

We propose to carry out our invention in two ways; and when soda is the substance chosen, we proceed—

First, by mixing litharge, hydrated oxides of lead, or insoluble basic salts of lead, with an equivalent of bicarbonate of soda, together with sufficient water to form a stiffish paste. This mixture is ground in a suitable mill, small quantities of water being from time to time added, as may be found requisite, until the change of the lead bodies into carbonates is complete. The paste is now well washed with water, and the supernatant liquid, which contains monocarbonate of soda, is separated from the white lead by filtration, and boiled down to dryness, and disposed of as soda-ash, or it may be crystallized, or may be again converted into bicarbonate of soda by treatment with carbonic acid, and used to convert further quantities of lead oxides, &c., into carbonates. Instead of grinding, the lead oxides, &c., in a fine state of division, may simply be mixed with bicarbonate of soda and water, and left to themselves, when the conversion into carbonates goes on in the same manner, only much more slowly.

Secondly, we mix litharge, hydrated oxides of lead, or basic salts of lead, with caustic soda, monocarbonate of soda, or acid carbonates of soda, and sufficient water to form a stiffish paste. The mixture is now introduced into a suitable closed mill, and during the grinding a stream of carbonic-acid gas is passed into it. After conversion of the lead bodies into carbonates, they are washed with water, and the supernatant liquid treated as before described.

In carrying out our process by this secondly-described method, we do not bind ourselves to any particular proportion of lead oxides and soda, but may say that equivalents of each answer very well. The quantity of the soda-salts may, however, be reduced with advantage if found desirable.

Grinding may also be dispensed with by mixing the lead oxides, &c., in a fine state of division, with the caustic soda, monocarbonate, or acid carbonates of soda, as described, and exposing the mixture in a suitable room to the action of carbonic acid.

We may say that artificial heat accelerates the conversion both in the first and secondly-described operations, but is not essential to their success.

We claim the manufacture of carbonate of lead, by the action of acid carbonates of the alkalies on litharge, hydrated oxides of lead, and insoluble basic salts of lead, either by direct addition, as described in our first part, or indirectly by the mixture of the lead oxides, &c., with the caustic alkalies or their monocarbonate or acid salts, and their conversion into bicarbonates during the time they are in contact with the litharge, hydrated oxides, or insoluble basic salts of lead.

Done at Manchester, England, this 29th day of September, A. D. 1869.

JOHN GALLEMORE DALE.
EDWARD MILNER.

Witnesses:
  G. T. HUGHES, *Patent Agent,*
    *39 Black Friars Street, Manchester.*
  G. SEPTIMUS HUGHES, *Patent Agent,*
    *39 Black Friars Street, Manchester.*